United States Patent
Rentschler et al.

(10) Patent No.: US 9,686,536 B2
(45) Date of Patent: Jun. 20, 2017

(54) METHOD AND APPARATUS FOR AGGREGATION AND STREAMING OF MONITORING DATA

(71) Applicant: ADVANCED MICRO DEVICES, INC., Sunnyvale, CA (US)

(72) Inventors: Eric Rentschler, Fort Collins, CO (US); Sebastien Nussbaum, Lexington, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 493 days.

(21) Appl. No.: 14/282,330

(22) Filed: May 20, 2014

(65) Prior Publication Data
US 2014/0340527 A1 Nov. 20, 2014

Related U.S. Application Data

(60) Provisional application No. 61/825,249, filed on May 20, 2013.

(51) Int. Cl.
*H04N 17/00* (2006.01)
*H04N 5/38* (2006.01)
*H04N 5/04* (2006.01)

(52) U.S. Cl.
CPC .................................. *H04N 17/00* (2013.01)

(58) Field of Classification Search
USPC ....... 348/180, 192–194, 723, 724, 500, 510, 348/516, 518; 345/501, 520
See application file for complete search history.

(56) References Cited

U.S. PATENT DOCUMENTS 7,190,738 B2 * 3/2007 Neugebauer et al. ........ 375/316
2008/0212518 A1 * 9/2008 Wells ............................ 370/316

* cited by examiner

*Primary Examiner* — Sherrie Hsia
(74) *Attorney, Agent, or Firm* — Faegre Baker Daniels LLP

(57) ABSTRACT

A video device having data lanes and a method of operating the video device includes generating performance monitoring and/or debug data in response to the operation of the video device. The generated data is sampled from component of the video device operating in various clocking domain. The data sampled from the components is combined into a unified stream which is independent of the various clocking domain. The unified stream is transmitted across one more data lanes of a video link along with corresponding audio and/or video data in real time.

18 Claims, 4 Drawing Sheets

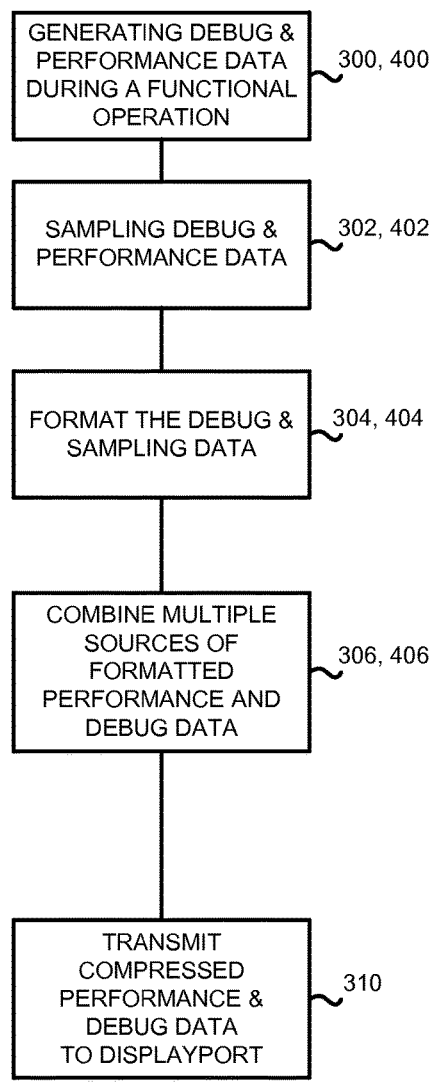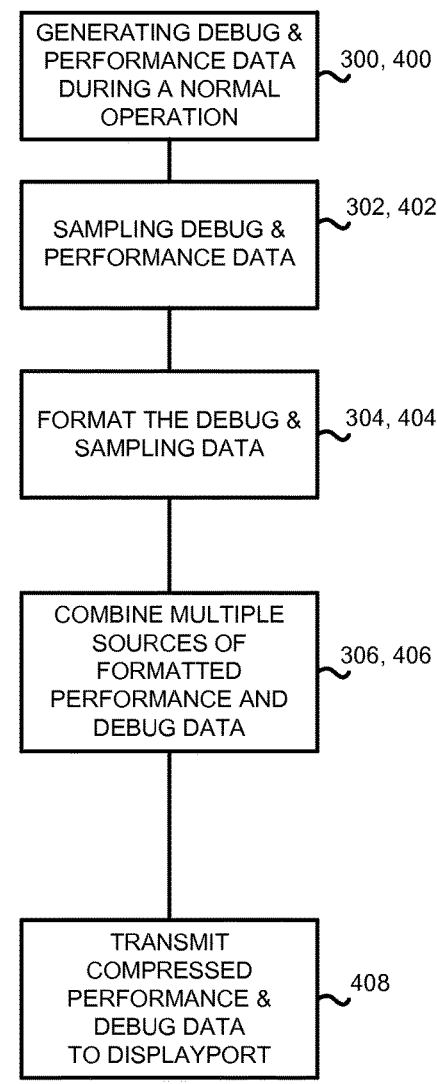
FIG. 5
FIG. 6

METHOD AND APPARATUS FOR AGGREGATION AND STREAMING OF MONITORING DATA

RELATED APPLICATIONS

This application claims priority to Provisional Application Ser. No. 61/825,389, filed on May 20, 2013, having inventors Eric Rentschler et al., titled "METHOD AND APPARATUS FOR AGGREGATION AND STREAMING OF PERFORMANCE MONITORING DATA", and is incorporated herein by reference.

BACKGROUND OF THE DISCLOSURE

The disclosure is related to methods and devices for providing a stream of performance monitoring data (which may include performance and/or debug bus data). The present disclosure is related more specifically to methods and devices for aggregating monitoring data for multi-stream transmission with video data over a unified cable.

Recording operational statistics of central processing units (CPU) and/or graphics processing units (GPU), such as detecting a number of cache hits or triggering events, of a video device during operation is known to be performed to monitor performance of the video device. One known technique, for example, uses interrupts that are initiated during each trigger event which requires a software stack to be executed as part of the processing operation and utilizes numerous counters along with numerous CPU and/or GPU processing cycles. Another technique involves accumulating events offline in memory and analyzing the accumulated events periodically. However, the system does not know when these events occur, only the number of events that have occurred. This information is typically inadequate for effective performance monitoring.

Accordingly, there exists a need to provide centralized streaming of monitoring data (which may include performance and/or data) without, in some instances, being limited by data structure size and in a manner that is non-invasive to the operation of the chip.

BRIEF DESCRIPTION OF THE DRAWINGS

The disclosure will be more readily understood in view of the following description when accompanied by the below figures and wherein like reference numerals represent like elements, wherein:

FIG. 5 is a flowchart illustrating another example of a method for operating a video device.

FIG. 6 is a flowchart illustrating another example of a method for operating a video device.

DETAILED DESCRIPTION OF EMBODIMENTS

Briefly, apparatus and methods are disclosed that provides real-time streaming of monitoring data (e.g., performance and/or debug data) from a video device rather than storing the data in memory which is later retrieved offline. Recording performance monitoring data of a CPU and a GPU, such as detecting a number of cache hits or triggering events, during operation is known to be performed to monitor performance of the processor. One known technique, for example, uses interrupts that are initiated during each trigger event which requires a software stack to be executed as part of the processing operation and utilizes numerous counters along with numerous CPU and/or GPU processing cycles. Another technique involves accumulating events offline in memory and analyzing the accumulated events periodically. However, the system does not know when these events occur, only the number of events that have occurred. This information is typically inadequate for effective performance monitoring.

Figure 1:
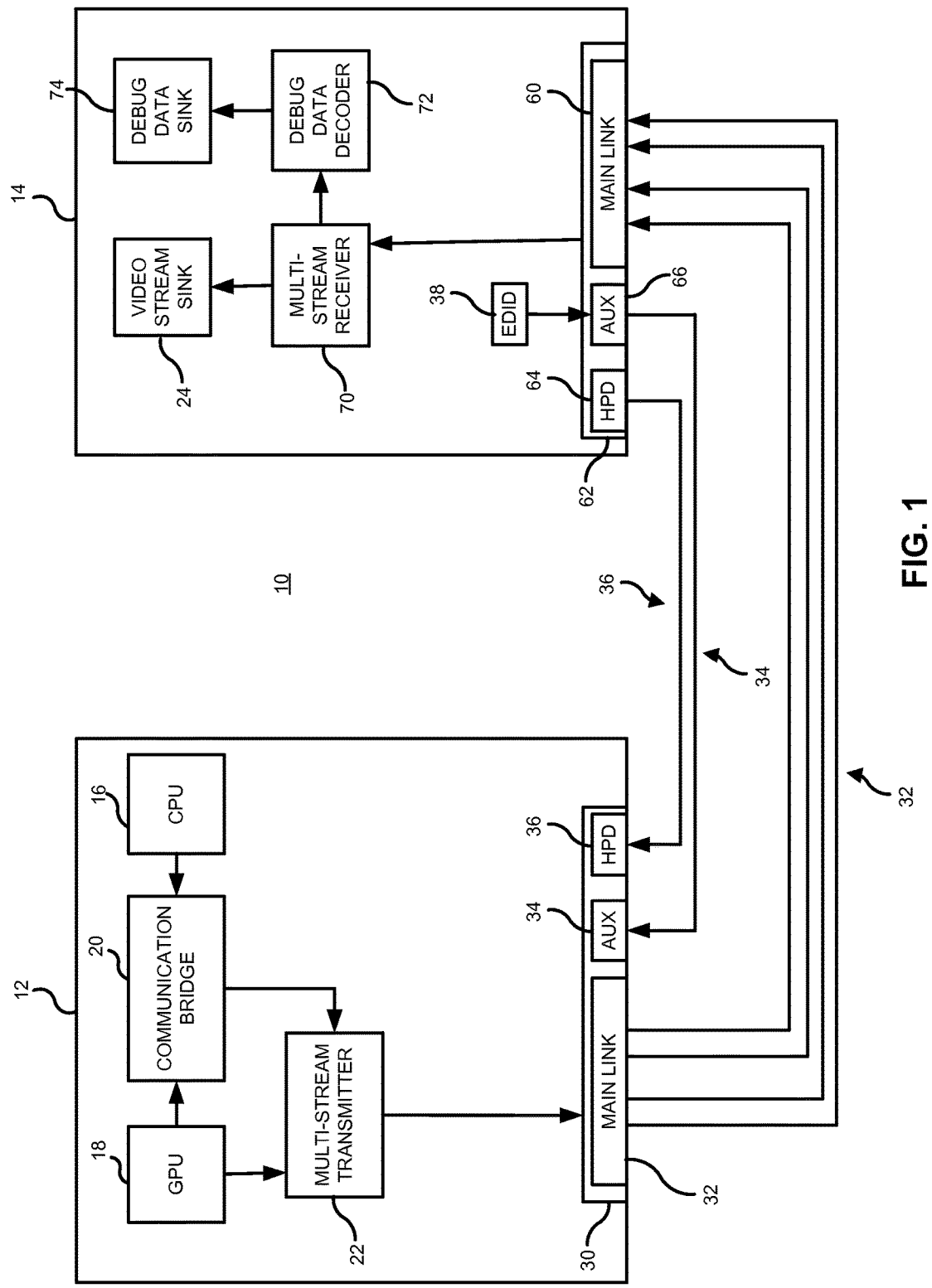
FIG. 1 is a block diagram illustrating one example of an embodiment employing an integrated circuit.

FIG. 1 illustrates one example of a video device 10 that includes a first device such as a video and/or audio source devices that provides a source of audio and/or video or other suitable information to be communicated to the second device 14, such as an LCD display, digital television, handheld device, or any other suitable device operable to receive the information communicated by the first device 12. The first device includes 12 includes electronic components comprising circuitry, such as one or more central processing units (CPU) 16, one or more graphics processing units (GPU) 18, and an integrated circuit 20 which handles communication in between or obtains data from the CPU 16, GPU 18, and other integrated devices such as, but not limited to, random access memory (RAM) and corresponding controllers, PCI Express (or AGP) devices, or the like of the video device 10. The integrated circuit 20 may include a communication bridge, such as a universal Northbridge, which obtains data from the various electronic components of the video device 10. The integrated circuit 20 may be referred to as a communication bridge hereon.

The GPU 18 and communication bridge 20 are coupled to a multi-stream transmitter 22, e.g. of the type compliant with the DisplayPort™ standard, which provides control symbols, control data, and video and/or data for concurrent and/or simultaneous transmission over a plurality of respective data lanes to a second device 14. The CPU 16, GPU 18, communication bridge 20, multi-stream transmitter 22, and the like can be considered to be components of the larger device 12 (e.g., as functional blocks which are part of a single integrated circuit disposed on a single die or a plurality of discrete integrated circuits interconnected by wire traces on a printed circuit board as part of the first device 12).

Generally, the DisplayPort™ standard defines a digital display interface standard that may connect, for example, a video and/or audio source device and its corresponding display monitor. For example, one or more video sources and corresponding display monitors may be connected via the DisplayPort™ communication interface in a home theater system, computer system or any other suitable system. A DisplayPort™ connector may support 1 to 4 data pairs that also carry audio and clock signals with link or transfer rates of, for example, 1.62 or 2.7 gigabits per second. A bi-directional auxiliary channel runs at a constant 1 megabit per second rate and serves as a main link management and device control using VESA EDID and VESA MCCS standards. A single cable may be used to support, for example, 10 gigabit per second forward link channel high resolution monitors for high definition video. A DisplayPort™ connection may consist of, for example, three components in a physical layer 30 such as the main link 32, the auxiliary channel (AUX) 34, and the hot plug detect signal line (HPD) 36. The HPD 36 only carries data in one direction, from the sink device (receiving device) to the source device (transmitting device). When a user connects devices using a DisplayPort™ communication interface, the HPD signal is used in the initiation of the exchange of data. The HPD can also be used as an interrupt line to allow the receiver to get the attention of the transmitter.

The AUX channel 34 offers bi-directional data signals with a 1 megabit per second data rate and data sent over this channel is involved in managing the link and device control. The main link 32 data lanes may be used at various link rates, i.e., to send different speeds of information such as video, audio, and data, depending upon the quality of the connecting cable and the capabilities of the source and receiving devices, i.e. the first device 12 and second device 14 respectively. However, the same link rate is used for all lanes once designated. Devices can use, for example, 1, 2 or 4 lanes. The link rate (transmission speed) and a number of lanes in use may depend on the needs of the second device 14. The main link 32 can carry data in only one direction from the video stream source 20 to the video stream sink 24. It also supports an optional HDCP content protection system for viewing HDTV, video and other protected content. The DisplayPort™ system is a digital display interface and in the main link 32, each data lane is a differential pair. The first device 12 serves as a master and the auxiliary channel is used to program the mode of the DisplayPort™ receivers to 1, 2 or 4 data lanes along with link rates and color depths. The first device 12 can read a register with, for example, extended display identification data, EDID 38, in the second device 14 and to instruct the multi-stream transmitter 22 to configure the main link 32 according to this information. The main link 32 utilizes encoding which, for example, translates an 8 bit byte to a 10 bit code and there may be, for example, 1,024 10 bit codes but only 256 data codes may be validated codes.

The device 12 may be any suitable device including, but not limited to, a laptop computer, tablet computer, desktop computer, video game console system, cell phone, smart phone, tablet, digital audio player, digital video player, such as but not limited to, DVD players, CD ROM players, cable TV card, satellite TV card, or any other suitable device that provides audio and/or video data or any other suitable data as desired, that is communicated to the second device 14.

With reference to FIG. 1, the video device 10 allows a user to stream in real-time both performance monitoring performance monitoring data and/or debug data without being limited by any inherent data structure size and in a manner that is non-invasive to the operation of the video device. The arrangement allows for a user to perform a computationally and/or graphically intensive operation with the video device 10 and acquire performance monitor and/or debug data related to the operation or the video device 10 while performing the operation without interfering with the operation itself. The video device can utilize existing debug data infrastructures and buffers to stream the performance monitor and/or debug data while also providing data loss indicators. For example, performance monitors 40 and/or debug state machines (DSM's) 42 can be integrated into the CPU 16, GPU 18, communication bridge 20, transmitter 22, and the like. The performance monitors 40 and/or DSM's 42 that are integrated with a corresponding electronic component included on the same die as the electronic component in various embodiments. The performance monitors 40 and/or DSM's 42 maybe included within the physical footprint of the electronic module or outside the physical footprint of the electronic module in other embodiments.

Referring also to FIGS. 2-6, methods of operation will also be described. The first device 12 can operate in a number of selectable modes, including a normal mode, a performance monitoring mode, and a debug mode among other contemplated modes. During a normal operation mode, the video device 10 performs the previously described plurality of functions as expected. Under a performance monitoring mode or normal mode, the first device 12 generates performance monitoring data 300 from the circuit elements within the device, for example the CPU 16, the GPU 18, the communication bridge 20, the multi-stream transmitter 22, and the like. The performance data is then aggregated, formatted, combined into a single unified stream of performance data 302, 304, 306, compressed 308, and finally transmitted 310, in real-time, to the second device 14 along with the corresponding video data. Similarly, under a debug mode, the first device 12 generates debug data 400 during a functional operation from the circuit elements within the device which is then aggregated 402, formatted 404, combined 406 into a single unified stream of debug data, compressed, and finally transmitted 408, in real-time, to the second device 14 along with the corresponding video data. From here on, the video device 10 will be described with regards to the performance monitoring (performance monitor) data, but it should be noted that the video device 10 can stream performance monitor and/or debug data in the same or a similar manner and can be interchanged unless otherwise noted (see FIGS. 5 and 6).

Figure 2:
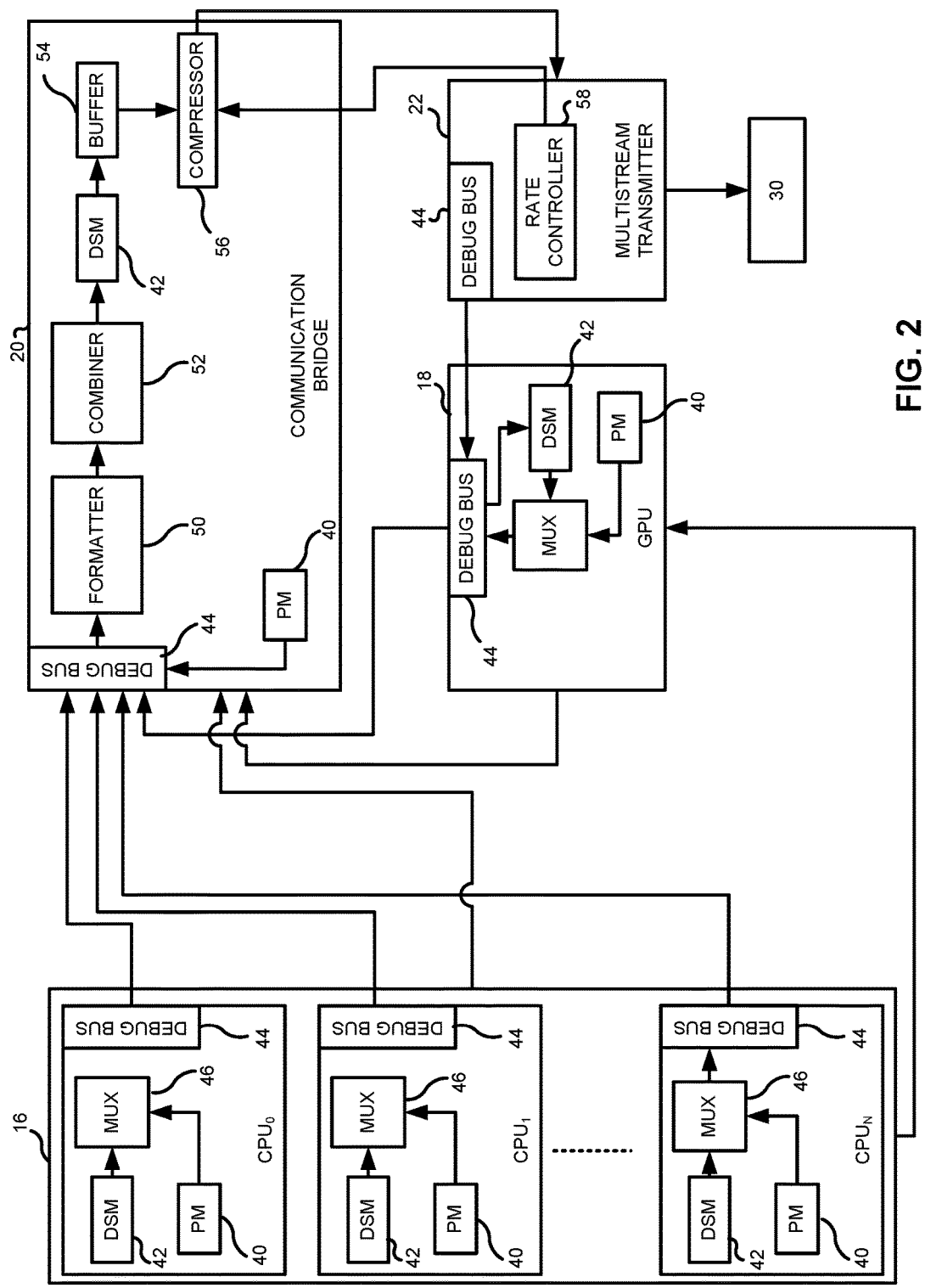
FIG. 2 illustrates one example of an integrated circuit in accordance with one example set forth in the disclosure.
Figures 3, 4:
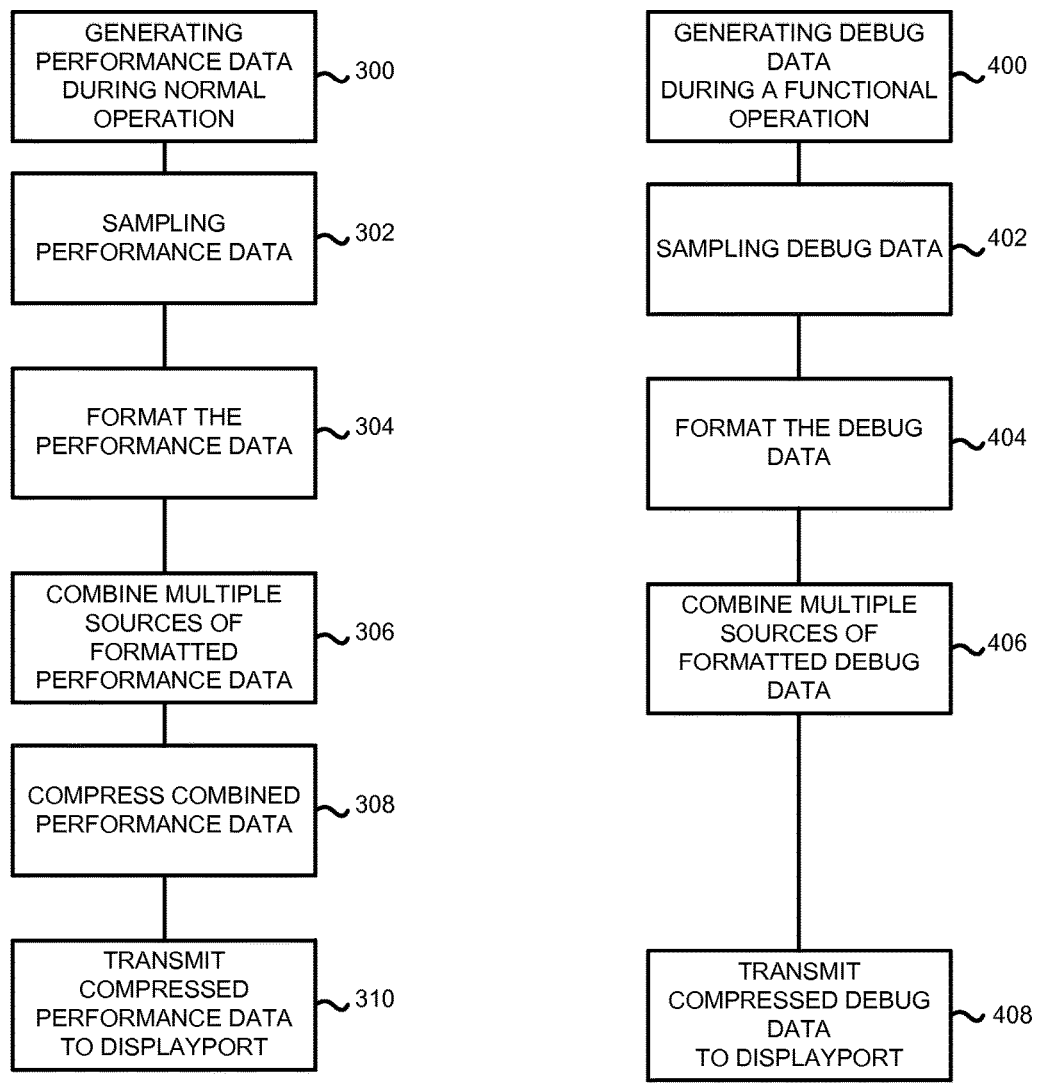
FIG. 3 is a flowchart illustrating an example of a method for operating a video device.
FIG. 4 is a flowchart illustrating another example of a method for operating a video device.

With reference to FIG. 2, some of the electronic components of the first device 12 include at least one performance monitor (performance monitor) 40 integrated therein. The performance monitor 40 measures or generates at least one performance metric of the corresponding component, e.g. CPU 16, GPU 18, communication bridge 20, multi-stream transmitter 22, and the like related to the operation of component. For example, a performance monitor 40 integrated into a core of the CPU 16 may output metrics such as temperature, clock speed, buffer cache utilization, CPU utilization, and the like whereas a performance monitor 40 integrated with the GPU 18 may output the same or similar metrics in addition graphics related performance metrics such as polygon count, shader operation, vertex data, and the like.

Similarly, some of the electronic components may include a DSM 42 integrated therein which, when operating in a debug mode, receives trigger events at observability points from within the corresponding component or from other DSM's 42 and performance monitors 40 integrated within the component or from other components. The triggers indicate the occurrence of a triggering event performing various operations, e.g. while the CPU 16 is executing software associated with a trace or test case. The triggering event may then be recorded by the DSM 42 or conveyed debug data for observation. The performance monitors 40 and DSM's 42 are integrated within various components of the first device 12 via a debug bus 44. The debug bus 44 functions as a conduit through which signals produced by any of the performance monitors 40 and/or DSM's 42 may be conveyed to anyone of the DSM's 42. The performance monitoring data and/or recorded debug data are multiplexed by a multiplexing structure 46 to convey the performance monitoring data and/or debug data onto the debug bus 44. Further details of embodiments of the 42 are disclosed in U.S. patent application Ser. No. 13/095,627 entitled "Debug State Machines and Method of Their Operation" and U.S. patent application Ser. No. 13/958,585 entitled "Debug State Machines and Processor Including the Same" which are hereby incorporated by reference in its entirety.

Each electronic component can generate performance monitoring data in various clocking domains and output performance monitoring data at various bandwidths. For example, a single core of the CPU 16 with an integrated performance monitor 40 may output 16 bits of performance monitoring data [0:15] along with 2 bits of control data [16:17]. One of the control bits includes data signifies the start of the performance monitoring data signal data while the other control bit signifies the validity of the performance monitoring data. The GPU 18 performance monitor 40 may output 32 bits of performance monitoring data [0:31] along with 2 bits of control data [32:33] similar to that of the CPU 16 control bits, one control bit signifying the start of the performance monitoring data signal and one control bit signifying the validity of the performance monitoring data. The communication bridge 20 may include a plurality of performance monitors 40, though only one is shown, which output 16 bits of performance monitoring data [0:15] from each performance monitor 40 and two bits of control data [16:17]. The control data from the communication bridge 20 performance monitors 40 is used to control which performance monitor 40 is outputting performance monitoring data. One control bit acts as a counter to identify which performance monitor 40 will output a signal on to the debug bus. Based on the counter signal, each performance monitors 40 will output performance monitoring data sequentially. The counter bit can be based on any of the clocking domains present within the first device 12. The first device 12 includes a marker register which generates identification data, such as CPU 16 core identification data, and timer data indicating how long the performance monitoring data has been generated at a bandwidth of 32 bits.

The performance monitoring data is aggregated and sampled via the debug bus 44 by the communication bridge 20. The communication bridge includes a formatter 50 which formats the bandwidth and clock speed of the incoming performance monitoring data and/or debug data from the various components such that a combiner 52 can combine the various streams into a congruent unified stream of performance monitoring data that can be streamed in real time. In various embodiments, the unified stream of performance monitoring data has a bandwidth of 64 bits comprising of four data lines each 16 bits wide. Based on the previously described example, the each CPU 16 core outputs 16 bits of performance monitoring data with 2 bits of control data, the GPU 18 outputs 32 bits of performance monitoring data along with 2 bits of control data, and the communication bridge 20 outputs 16 bits of performance monitoring data from each of its performance monitors 40. Since, in this example, the unified stream of performance monitoring data is 64 bits wide, the formatter 50 formats each signal acquired from the debug bus 44 into each of the four 16 bit lanes of the formatted performance monitoring data. For example, a first data lane [0:15] can comprise of the communication bridge 20 performance monitoring data [1:0] along with the control bits from each performance monitor such as 2 bits from a first CPU core [3:2], 2 bits from a second CPU core [5:4], 2 bits of control data from the GPU 18 [7:6], and 8 bits of marker register data [15:8] for a total of 16 bits of data. The second, third, and fourth data lanes can comprise of a first CPU 16 core performance monitoring data [31:16], a second CPU 16 core performance monitoring data [47:32], and the GPU 18 performance monitoring data [63:48], respectively.

To fit a wider bandwidth signal from the performance monitors 40 such as from the GPU 18 and communication bridge 20 performance monitoring data into the 16 bit data lanes, the formatter 50 can cycle data portions of the performance monitoring data signals in back-to-back clock cycles. For example, if the GPU 18 generates 32 bits of performance monitoring data and at half the frequency as the communication bridge, the formatter 50 places 16 bits of the performance monitoring data into the unified stream of performance monitoring data during each clock cycle at which communication bridge 18 operates. Thus, in one clock cycle the first 16 bits [15:0] are placed into the unified stream and during the subsequent clock the second 16 bits [31:16] are placed into the unified stream. This repeats for all of the valid GPU 18 performance monitoring data. In a similar manner, the formatter 50 can cycle the 16 bits of communication bridge 20 performance monitoring data onto the 2 bits [1:0] allocated within the first data lane during eight clock cycles. After eight clock cycles, the next 16 bit packet of performance monitoring data from the communication bridge is formatted on the allocated pair of bits. The 32 bits of marker register data can also be cycled onto the 8 bits [15:8] allocated within the first data lane. The formatter 50 cycles 8 bits at a time for four clock cycles until the entire 32 bit packet of marker register data is cycled. In cycles where no valid marker, control, and/or performance monitoring data is not generated, then zeroes can be driven on the corresponding bits of the data stream.

It should be appreciated that the data lanes and/or the width of each data lane can be adjusted according to the number of devices generating performance monitoring data. For example, if only one device is generating performance monitoring data then either one of the control data and marker register data (which identifies the component generating performance monitoring data and the validity of the data) can be ignored and the width of the data lane containing the corresponding performance monitoring data can increased to allow for a greater bandwidth of performance monitoring data to be streamed.

The formatter 50 formats the performance monitoring data according to the preselected packet structure. For example, the formatter can use a packet structure that is 64 bits wide which includes four data lanes. The first data lane [15:0] may include both control data and marker register data, the second data lane [31:16] may include performance monitoring data from a first CPU 16 core, the third data lane [47:32] may include performance monitoring data from a second CPU 16 core, and the fourth data lane [63:48] includes performance monitoring data from the GPU 18. It should be noted that the arrangement of the data lanes and the bits assigned to each data lane can be configurable according to various configurations of electronic components of the video device 10. The combiner 52, as part of the communication bridge 20, combines and/or multiplexes the individual bits from the formatter into the unified stream of performance monitoring data 306. The communication bridge also includes a DSM 42 which writes the unified stream of debug data onto a buffer 54. The buffer 54 transmits the buffered stream of performance monitoring data to a compressor 56. The compressor 56 compresses the buffered stream of performance monitoring data in order to better optimize bandwidth of the multistream transmitter 22 made available for the stream of performance monitoring data. The compressor 56 can remove null data, i.e. invalid data lanes as indicated by corresponding control bits, from the data stream to optimize the band width for data to be allocated from elsewhere, or the compressor can pad the data stream ensure bandwidth compatibility between an electrical components of the first device 12 or between the first device 12 and the second device 14.

The output rate from the buffer 54 to the compressor 56 is controlled by via a rate controller 58 of the transmitter 22. The rate controller 58 provides flow control such that the bandwidth from the compressor 56 does not exceed the available bandwidth available in the multistream transmitter 22. The flow rate can be determined according to the video data that will be accompanying the performance monitoring data and/or debug data across the data link to the second device 14. For example, if the video data and audio data have low resolutions or are low quality, the rate controller 58 can increase the bandwidth of the stream of performance monitor and/or debug data to take advantage of the available bandwidth. Alternatively, if the video and/or audio data are high resolution or high quality, the bandwidth available to the stream the performance monitor and/or debug data can be reduced to accommodate the increase in video and/or audio data streamed to the second device 14. The unified stream of data can be sent 64 bits at a time to the multistream transmitter 22, while the rate at which the data is sent is controlled by the flow controller 58. Vice versa, the flow controller 58 can control the bandwidth of the video and/or audio data stream based on the desired bandwidth of performance monitor and/or debug data such as if multiple sources are selected to output debug and/or performance monitoring data into the unified stream. The flow controller 58 can access a streaming data control register in the communication bridge which stores the desired output rate to the transmitter 22 such that the transmitter 22 is not overrun.

The multistream transmitter 22 packetizes the unified stream and audio/video data stream for multi-stream transport across the main link 32. The transmitter 22 injects timestamps independent of the clocking of the unified stream of performance monitor and/or debug data and generates error correction codes for the packetizing the data streams based on the timestamps. With reference to FIG. 1, the packetized multi-stream transport of the unified stream of performance monitor and/or debug data along with audio/video data streams are received by a multi-stream receiver 70 via a main link 60 of the second device 14. Similar to the first device 12, the second device physical layer 62 includes the main link 60, hot plug detect channel 64, and an aux channel 66. The multi-stream receiver 70 decodes the unified stream of performance monitor and/or debug data and the stream of audio/video data into separate streams. The unified stream of performance monitor and/or debug data is received by a data decoder 72 to decode the individual streams amongst the unified stream of performance monitor and/or debug data. The decoded data is transmitted to a data sink device to display or convey the performance monitor and/or debug data to a user. The stream of audio/video data is decoded by a multi-stream decoder (not shown) of the receiver 70 and supplied to a video sink device 24 for display to the user.

The software operations described herein can be implemented in hardware such as logic fixed function circuits including but not limited to state machines, field programmable gate arrays, application-specific circuits or other suitable hardware. The hardware may be represented in executable code stored in non-transitory memory such as RAM, ROM or other suitable memory in hardware descriptor languages such as, but not limited to, RTL and VHDL or any other suitable format. The executable code when executed may cause an integrated fabrication system to fabricate an IC with the operations described herein.

Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer-readable medium such as, but not limited to, CDROM, RAM, other forms of ROM, hard drives, distributed memory, etc. The instructions may be represented by any suitable language such as, but not limited to, hardware descriptor language (HDL), Verilog or other suitable language. As such, the logic, software and circuits described herein may also be produced as integrated circuits by such systems using the computer-readable medium with instructions stored therein. For example, an integrated circuit with the aforedescribed software, logic and structure may be created using such integrated circuit fabrication systems. In such a system, the computer readable medium stores instructions executable by one or more integrated circuit design systems that cause the one or more integrated circuit design systems to produce an integrated circuit.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

What is claimed is:

1. A method of operating a video device comprising:
generating monitoring data corresponding to a plurality of components in response to the operation of the video device, each component operating in an associated clocking domain;
sampling the monitoring data from each component at a sampling rate corresponding to the associated clocking domain;
combining the sampled monitoring data from the plurality of components into a unified stream independent of the associated clocking domain;
transmitting the unified stream of monitoring data across one or more data lanes of a video link.

2. The method according to claim 1, further including:
generating a global clocking signal to synchronize monitoring data generated in various clocking domains.

3. The method according to claim 2, further including:
buffering the unified stream of monitoring data;
inserting a time stamp into the buffered unified stream streaming monitoring data according to the global clocking signal;
determining an available bandwidth across the data lanes of the video link; and
transmitting the buffered unified stream performance monitoring data according to the determined available bandwidth.

4. The method according to claim 1, further comprising:
generating control data for each component, the control data signifying the validity of the generated performance monitoring data; and
generating marker data for at least one component, the marker data signifying identification data and/or timer data.

5. The method according to claim 1, wherein the unified stream of performance monitoring data includes a plurality of data lanes, each data lane corresponding to a component and one data lane corresponding to the control and marker data.

6. The method according to claim 1, further comprising:
formatting the generated performance data according to a bandwidth of a debug bus corresponding to each component.

7. The method according to claim 1, wherein the step of transmitting the unified stream of performance data further includes:
framing the unified stream of performance data to imitate video data for transmission across the one or more data lanes of the video link.

8. The method according to claim 7, wherein the framing is consistent with a multi-stream video transmission protocol.

9. A video device comprising:
a plurality of monitors which generate monitoring data corresponding to a plurality of components in response to the operation of the video device, each component operating in an associated clocking domain;
a communication bridge which samples the monitoring data from each component at a sampling rate corresponding to the associated clocking domain;
a combiner which combines the sampled monitoring data from the plurality of discrete components into a unified stream of monitoring data independent of the associated clocking domain;
a transmitter which transmits the unified stream of monitoring data across one or more data lanes of a video link.

10. The video device according to claim 9, further including:
a global clock which generates a global clocking signal to synchronize performance monitoring data generated in various clocking domains.

11. The video device according to claim 10, further including:
a buffer which buffers the unified stream of performance monitoring data; and
a rate controller which inserts a time stamp into the buffered unified stream of performance monitoring data according to the global clocking signal and determines the an available bandwidth across the data lanes of the video link.

12. The video device according to claim 9, where in each component generates control data signifying the validity of the generated performance monitoring data and at least one component generates marker data signifying identification data and/or timer data.

13. The video device according to claim 9, wherein the unified stream of performance monitoring data includes a plurality of data lanes, each data lane corresponding to a component and one data lane corresponding to the control and marker data.

14. The video device according to claim 9, further comprising:
a formatter which formats the generated monitoring data according to a bandwidth of a debug bus corresponding to each component.

15. The video device according to claim 9, wherein the transmitter which transmits the unified stream of monitoring data further includes:
framing the unified stream of performance data to imitate video data for transmission across the one or more data lanes of the video link.

16. The video device according to claim 15, wherein the framing is consistent with a multi-stream video transmission protocol.

17. A computer readable medium containing non-transitory instructions thereon, that when interpreted by at least one processor, cause the at least one processor to:
generating monitoring data corresponding to a plurality of components in response to the operation of the video device, each component operating in an associated clocking domain;
sampling the monitoring data from each component at a sampling rate corresponding to the associated clocking domain;
combining the sampled monitoring data from the plurality of components into a unified stream independent of the associated clocking domain;
transmitting the unified stream of monitoring data across one or more data lanes of a video link.

18. A storage medium that comprises executable instructions thereon that when executed by an integrated circuit fabrication system, causes the system to form an integrated circuit that comprises:
a plurality of monitors which generate monitoring data corresponding to a plurality of components in response to the operation of the video device, each component operating in an associated clocking domain;
a communication bridge which samples the monitoring data from each component at a sampling rate corresponding to the associated clocking domain;
a combiner which combines the sampled monitoring data from the plurality of components into a unified stream of monitoring data independent of the associated clocking domain;
a transmitter which transmits the unified stream of monitoring data across one or more data lanes of a video link.

* * * * *